No. 819,159. PATENTED MAY 1, 1906.
R. M. NEWBOLD.
STORAGE BATTERY JAR.
APPLICATION FILED APR. 24, 1905.

Witnesses:
W. H. Cotton
Charles B. Gillson

Inventor:
Roger M. Newbold.
By
Atty.

UNITED STATES PATENT OFFICE.

ROGER M. NEWBOLD, OF LOUISVILLE, KENTUCKY, ASSIGNOR TO THE ADAMS & WESTLAKE COMPANY, A CORPORATION OF ILLINOIS.

STORAGE-BATTERY JAR.

No. 819,159.     Specification of Letters Patent.     Patented May 1, 1906.

Application filed April 24, 1905. Serial No. 257,145.

*To all whom it may concern:*

Be it known that I, ROGER M. NEWBOLD, a citizen of the United States, and a resident of Louisville, county of Jefferson, and State of Kentucky, have invented certain new and useful Improvements in Storage-Battery Jars, of which the following is a specification and which are illustrated in the accompanying drawings, forming a part thereof.

The invention relates to jars for containing the elements and electrolyte of a storage or secondary battery, its object being to provide a closure for the jar which while being liquid-tight is readily removable; and it consists in a jar having a closure in the form of a lid which slides within the walls of the jar and is provided with an expansible flange at its margins and similar flanges encircling the terminal apertures.

The invention is illustrated in the accompanying drawings, in which—

Figure 1:
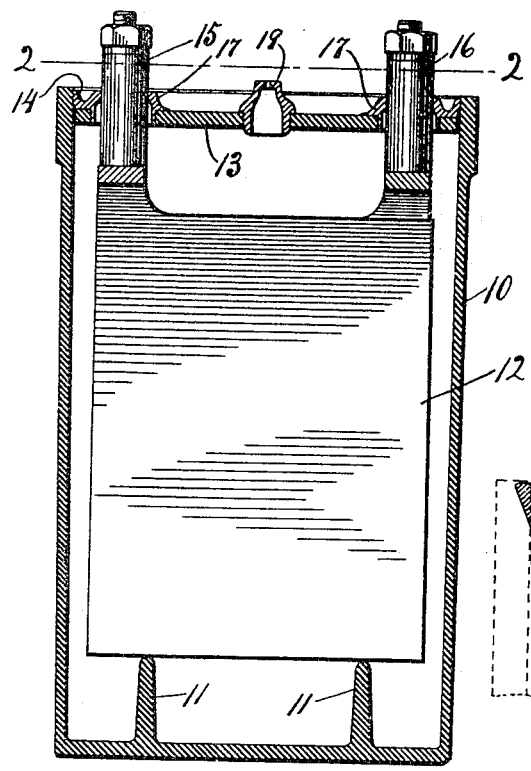
Figure 3:
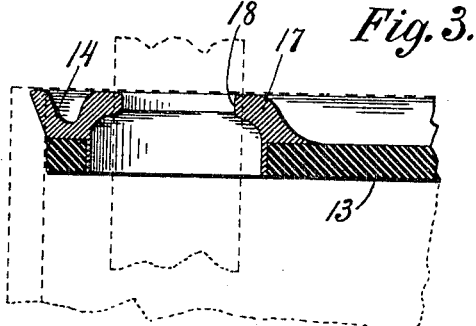
Figure 2:
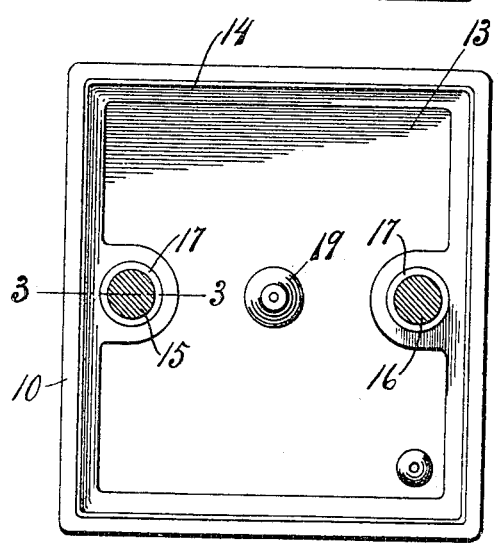
Figure 4:
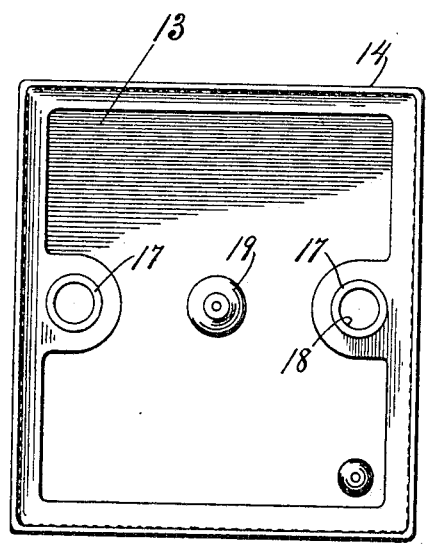

Figure 1 is a central vertical section of a storage battery. Fig. 2 is a plan section on the line 2 2 of Fig. 1. Fig. 3 is a detail section on the line 3 3 of Fig. 2, and Fig. 4 is a plan view of the cover.

The jar 10 is of any desired form, being shown as substantially square in horizontal section and having parallel side walls and ribs 11 upstanding from its bottom for separating the elements 12 of the battery.

The cover 13 is of such size that it makes a loose fit with the walls of the jar, and a continuous flange 14, preferably of rubber, is secured to its upper face along its margins and projects laterally therefrom, giving the cover normally a greater area than the internal cross-sectional area of the jar. As the cover is fitted into the jar the flange 14 is forced back, and hence makes a close fit with the jar-walls. Each of the apertures formed in the cover 13 for the accommodation of the terminals 15 16 is surrounded by a collar 17, preferably of soft rubber, and having an instanding flange 18, thus contracting the aperture to less diameter than the diameter of the terminal. As the cover is forced into the jar the terminals pass through the apertures, spreading the flanges 18, and thereby securing a tight fit. As shown, the collars 17 are formed integral with the flange 14, although obviously this is not essential. At 19 is shown a plug placed at the center of the cover 13 and serving as means for giving access to the interior of the battery for the purposes of inspection and regulation.

As heretofore made the covers of battery-jars have either been fitted loosely within the jar or the joints have been made tight by the use of wax or similar material applied after the charging operation. When the cover is loose, there is apt to be an escape of the liquid contents of the jar, especially in railway service, and also due to the effervescing action which takes place as the battery becomes completely charged. The liquid being acid, its escape is injurious to any articles which may be adjacent to the battery and to the external metal parts of the battery itself and its connections. When a tight fit for the cover is secured by the application of a plastic material, the latter must be broken in order to open the jar, and consequently its use is attended with considerable inconvenience and expense.

The jar-closure herein shown and described is permanent in its character. It is an integral structure not necessitating the use of gaskets or other seal, and, furthermore, entirely prevents the escape of the liquid contents of the jar.

I claim as my invention—

1. A battery-jar closure comprising, in combination, a rigid plate, and a soft flange projecting from the margin of the plate and inclined upwardly from the plane thereof, whereby the flange presents a flat face to the walls of the jar.

2. A battery-jar closure comprising, in combination, a rigid plate having terminal apertures, and soft flanges projecting from the margins of the plate and of the apertures and being inclined upwardly from the plane of the plate, whereby the flanges present a flat face to the walls of the jar and to the terminals.

3. A closure for battery-jars, comprising a substantially rigid plate having apertures for the battery-terminals, and soft-rubber flanges projecting beyond its margins and encircling the terminal apertures and projecting inwardly.

4. A closure for battery-jars comprising a substantially rigid plate having apertures for battery-terminals, and flanges projecting beyond the margins of the plate and encircling and projecting into the terminal apertures, such flanges being of material more flexible than the plate.

5. A closure for battery-jars comprising a substantially rigid plate having apertures for battery-terminals, and flanges encircling and projecting into the terminal apertures, such flanges being of material more flexible than the plate.

ROGER M. NEWBOLD.

Witnesses:
  LOUIS K. GILLSON,
  CHARLES B. GILLSON.